US012521182B2

(12) United States Patent
Bullens et al.

(10) Patent No.: US 12,521,182 B2
(45) Date of Patent: Jan. 13, 2026

(54) APPARATUS, SYSTEM AND METHOD FOR IDENTIFYING SUBINTIMAL PATH OF A FLEXIBLE ELONGATED DEVICE

(71) Applicant: KONINKLIJKE PHILIPS N.V., Eindhoven (NL)

(72) Inventors: Roland Wilhelmus Maria Bullens, Mierlo (NL); Ahmet Ekin, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 280 days.

(21) Appl. No.: 18/569,152

(22) PCT Filed: Jun. 7, 2022

(86) PCT No.: PCT/EP2022/065347
§ 371 (c)(1),
(2) Date: Dec. 11, 2023

(87) PCT Pub. No.: WO2022/263223
PCT Pub. Date: Dec. 22, 2022

(65) Prior Publication Data
US 2024/0268893 A1 Aug. 15, 2024

(30) Foreign Application Priority Data
Jun. 14, 2021 (EP) .................................... 21179223

(51) Int. Cl.
*A61M 25/09* (2006.01)
*A61B 34/10* (2016.01)

(52) U.S. Cl.
CPC .............. *A61B 34/10* (2016.02); *A61M 25/09* (2013.01); *A61B 2034/104* (2016.02); *A61B 2034/107* (2016.02)

(58) Field of Classification Search
CPC .............. A61B 34/10; A61B 2034/104; A61B 2034/107; A61B 2034/2051;
(Continued)

(56) References Cited

U.S. PATENT DOCUMENTS 10,267,624 B2 4/2019 Breisacher
10,391,282 B2 8/2019 Root et al.
(Continued)

FOREIGN PATENT DOCUMENTS

WO 2020242491 A1 12/2020

OTHER PUBLICATIONS

Sumitsuji et al., "Fundamental wire technique and current standard strategy of percutaneous intervention for chronic total occlusion with histopathological insights", JACC Cardiovascular Interventions, vol. 4 No. 9, (2011) pp. 941-951.
(Continued)

*Primary Examiner* — Brian T Gedeon

(57) ABSTRACT

The present invention relates to an apparatus and computer-implemented method for identifying subintimal path of a flexible elongated device (10) through a lumen. The apparatus comprises a memory storing data processing instructions configured with curvature-related parameters to process shape- and/or position-related data of an elongated device so as to (i) determine curvature profiles along this elongated device and to ii) associate a curvature profile with a type of curvature representative of subintimal path in the lumen, and a processor in communication with the memory configured to execute the instructions to shape- and/or position-related data measured along at least one segment of the elongated device (10) and to output an information if a subintimal path has been identified.

15 Claims, 9 Drawing Sheets

(58) Field of Classification Search
CPC . A61B 2034/2061; A61B 2017/00119; A61M 25/09; A61M 2025/0197; A61M 2025/09183
See application file for complete search history.

(56) References Cited

U.S. PATENT DOCUMENTS

| | | |
|---|---|---|
| 2016/0051323 A1 | 2/2016 | Stigall et al. |
| 2019/0159842 A1 | 5/2019 | Razeto et al. |
| 2019/0346319 A1* | 11/2019 | Bydlon ................. A61B 34/20 |
| 2020/0163584 A1 | 5/2020 | Barley et al. |

OTHER PUBLICATIONS

International Search report and Written Opinion of PCT/EP2022/065347, dated Sep. 6, 2022.

* cited by examiner

APPARATUS, SYSTEM AND METHOD FOR IDENTIFYING SUBINTIMAL PATH OF A FLEXIBLE ELONGATED DEVICE

CROSS-REFERENCE TO PRIOR APPLICATIONS

This application is the U.S. National Phase application under 35 U.S.C. § 371 of International Application No. PCT/EP2022/065347, filed on Jun. 7, 2022, which claims the benefit of European Patent Application No. 21179223.9, filed on Jun. 14, 2021. These applications are hereby incorporated by reference herein.

FIELD OF THE INVENTION

The present invention relates to an apparatus, method and system for identifying subintimal path of a flexible elongated device through a lumen. The invention further relates to a corresponding computer program. The invention is useful in the field of endovascular interventions, in particular for treatment of chronic total occlusions.

BACKGROUND OF THE INVENTION

Chronic total occlusions (CTO) in arteries can be treated by crossing the CTO with a guidewire and subsequently ballooning the occluded area. Additionally, a stent can be placed. The CTO can be crossed intraluminal or via the subintimal. Physicians are often not exactly aware of how they have crossed the CTO with the guidewire. This may have critical clinical implications. In particular, atherectomy, i.e. debulking of the material in the occlusion, can only be performed if the crossing of the CTO is intraluminal. Thus, there is a need for a detector detecting if the guidewire undergoes subintimal path through the vessel.

U.S. Pat. No. 10,267,624 D2 discloses a system for reconstructing a trajectory of an optical fiber. The system comprises an optical fiber to be inserted into an object, wherein the optical fiber has a length and at least one bending sensor unit arranged along its length. The system also comprises a measurement device configured to measure insertion length increments of the optical fiber and an interrogation device configured to detect optical feedback signals from the at least one bending sensor unit. The system further comprises a processor device configured to reconstruct the trajectory of the optical fiber along its inserted length using data pairs which are based on measured insertion length increments and detected optical feedback signals assigned thereto.

SUMMARY OF THE INVENTION

It is an object of the present invention to provide an apparatus with which subintimal path of a flexible elongated device through a lumen may be reliably identified.

It is a further object of the present invention to provide such an apparatus which warns a user if an elongated device undergoes subintimal path through a vessel.

It is a further object of the present invention to provide a corresponding system and method.

In a first aspect of the present invention, an apparatus for identifying subintimal path of a flexible elongated device through a lumen is provided, comprising:
 a memory storing data processing instructions configured with curvature-related parameters to process shape- and/or position-related data of an elongated device so as to (i) determine curvature profiles along this elongated device and to ii) associate a curvature profile with a type of curvature representative of subintimal path in the lumen,
 a processor in communication with the memory configured to execute the instructions to shape- and/or position-related data measured along at least one segment of the elongated device (10) and to output an information if a subintimal path has been identified.

The present invention is based on the idea that a flexible elongated device which is navigated along a subintimal path should exhibit a shape which significantly differs from the shape of the flexible elongated device when navigated along an intraluminal path. In particular, the shape of the flexible elongated device navigated along a subintimal path may be considered to be a spiraled or helical shape. A perfect or ideal helix has a constant curvature along the helix. Thus determining the curvature profile of the elongated device in one or more shape segments of the elongated device is advantageous for detecting subintimal path. However, the shape of the device will not be a perfect helix in the subintimal region due to inaccuracy in e.g. the shape sensing process, shape- and/or position-related data imprecision and the difference of the actual navigation from a helix so that the actual shape of the elongated device in the subintimal region will deviate from an ideal helix shape. Therefore, the present invention proposes to analyze the curvature profile to identify one or more sections in the curvature profile which may be candidates for a subintimal path of the elongated device. This is based on the idea that in the subintimal region of the path of the elongated device curvature values should be observed in the curvature profile which are recognizably elevated in comparison to an intraluminal region of the path of the elongated device. For an intraluminal path, curvature is zero or low. Thus, according to the present invention, the curvature profile is analyzed to determine whether the elongated device exhibits an elevated curvature in one or more sections to identify an intraluminal path of the device and to output an information, if a subintimal path has been identified. The present invention thus enables quick and accurate detection of the occurrence of subintimal navigation of a flexible elongated device with low amount of computation. The invention is beneficial in endovascular interventions, in particular in treating CTO.

In a first embodiment, the instructions comprising:
 measuring a curvature profile along at least one shape segment of the elongated device (10), and
 determining in the curvature profile at least one section (A-B), in which the curvature profile is above a first curvature threshold level (20) defined as representative of a deformation of the elongated device (10) which may be due to an obstacle in the path of the elongated device (10),
 determining from curvature values of the curvature profile in the at least one section (A-B) a curvature strength parameter indicative of curvature strength in the at least one section (A-B),
 identifying the path of the elongated device (10) through the lumen as subintimal path, if the curvature strength parameter is above a subintimal threshold level, and
 outputting said information as a warning when subintimal path has been identified.

In this embodiment, the curvature profile is measured, e.g. by a shape sensing modality, and analyzed by the processor to determine at least one section in which the curvature profile is above a first curvature threshold level defined as representative of a deformation of the elongated device which may be due to an obstacle in the path of the elongated device. Other sections where the curvature profile is below the curvature threshold value may be disregarded to save computational time. If a section in which the curvature profile is above the curvature threshold level is determined, a curvature strength parameter is then determined from curvature values in this section. The curvature strength parameter may be an indicator for the amount of deviation of the shape from a straight shape. In particular, the curvature strength parameter may be an indicator whether the curvature profile in the at least one section resembles a curvature profile of a helical or spiraled shape. If the curvature strength parameter is above a subintimal threshold level defined as a representative indicating subintimal path, the path of the elongated device through the lumen is identified as subintimal path. The physician is warned if subintimal path of the elongated device has been identified.

During navigation of the flexible elongated device through a lumen, e.g. an artery, a plurality of shape runs may be performed, and the measured curvature profiles in the shape runs may be analyzed as described before to monitor whether subintimal passage occurs during navigation.

In a second embodiment, the instructions comprising:
a curvature classifier configured with curvature-related parameters to receive shape- and/or position-related data of the elongated device and to output a classification of curvatures along said at least one segment, wherein the classifier is configured to output at least one classification of curvature associated with a subintimal path, wherein the processor in communication with the memory is configured to apply the curvature classifier to shape- and/or position-related data measured along said at least one segment of the elongated device (10) to output said information of a subintimal path if a subintimal path class has been found by the classifier.

In this embodiment, the invention makes use of artificial intelligence, by collecting large sets of data, annotating the data, and using the data to train a deep learning method or another machine-learning method, such as decision trees, random forests, support vector machines, or neural networks. An AI-based algorithm can be used to classify a shape in one of pre-determined classes, such as the elongated device tip in a normal region, tip entering the subintimal region, tip passed the subintimal region, and so on, without estimating specific curvature parameters. The input to such an AI-based algorithm can be curvature profile of the elongated device, or shape of the elongated device as a set of 3D point coordinates, or a combination of the two so that AI-based algorithm can pick additional features to curvature.

Further embodiments of the invention are defined below and are further disclosed herein.

In an embodiment, the instructions may comprise determining the curvature strength parameter as the sum of curvature values in the at least one section of the curvature profile. The sum of the curvature values of the curvature profile in the region of interest is then compared with the subintimal threshold level, and if the sum of the curvature values is above the subintimal threshold level, the warning that subintimal path has been identified is output. The term "sum" may also include the integral of the curvature profile in the at least one section, in which the curvature profile is above the first curvature threshold level. Summing discrete curvature values is advantageous in terms of computational expenditure.

In another embodiment, the instructions may comprise determining the curvature strength parameter as the mean of curvature values in the at least one section of the curvature profile. Computing the mean of the curvature values also is advantageous in terms of computational expenditure.

In a further embodiment, the instructions may comprise identifying the at least one section as not indicating subintimal passage, if the maximum curvature value is below a second curvature threshold level higher than the first curvature threshold level. If the maximum curvature value is below the second curvature threshold level, the at least one section can be considered as invalid, and determination of the curvature strength parameter may be omitted for this section. Subjecting the analysis of the curvature profile in the section where the curvature profile is above the first curvature threshold level to a second higher curvature threshold value has the advantage that noisy calculations in this section may be prevented or the curvature profiles exceeding the first threshold for a long time but not achieving a maximum value as high as the second threshold may be discarded. The ratio of the second curvature threshold value and the first curvature threshold value may be in a range from 1.5 to 3, e.g. 2.

In a further embodiment, the instructions may comprise determining the at least one section by determining crossing points of the curvature profile with the first curvature threshold level. This operation in the analysis of the curvature profile again has the advantage of low computational expenditure.

Measuring the curvature profile may be limited to one shape segment of the elongated device, wherein in this case it is preferred that the shape segment includes the distal tip of the device, as the occurrence of subintimal path of the flexible elongated device is most expected at the distal tip of the device. Measuring the curvature profile may also be performed along one or more other shape segments between the distal tip and the proximal end. Curvature strength parameters may be computed for each of these shape segments.

Alternatively, the region to compute the curvature strength parameter can be determined from anatomical information. For instance, on contrast-enhanced X-ray or 3D anatomical data, occlusion regions can be identified. After registering the shape to X-ray and 3D anatomical data, the method according to the invention can be triggered when the flexible elongated device is in the occlusion region identified in the anatomical image data.

In a further embodiment, the instructions may comprise determining the distance of the distal end of the at least one section from the distal tip of the elongated device, and to identify the at least one section as the distal tip portion, if the determined distance is lower than a threshold distance.

If the determined distance is above the threshold distance, the segment is not considered a segment including the distal tip of the device, and the curvature strength in the distal tip segment may be set to zero.

In a further embodiment, the instructions may comprise setting at least two different subintimal thresholds, and outputting different warnings according to the different subintimal thresholds. It is advantageous to provide a warning scheme which takes into account of the severity of the deviation of the passage of the elongated device from intraluminal passage. For example, multiple warning levels may be defined, and depending on above which of these levels the curvature strength parameter is, a different warning is output. For example, a color-coded warning may be provided, such as yellow, orange, light red, and dark red, wherein this order of colors indicates increasing severity of the deviation of the passage from intraluminal path.

In a further preferred embodiment, the instructions may comprise setting a time limit and outputting the warning if the curvature profile representative of subintimal path is detected for a time period exceeding the time limit. In this embodiment, outputting a warning is not only subject to e.g. the crossing of the subintimal threshold, but also to a timing constraint, i.e. the warning is only output when both subintimal threshold and time limit are exceeded. This embodiment takes into account that subintimal passage may only occur for a short time period. e.g. below 1 or 2 seconds, and thereafter the elongated device undergoes an intraluminal path again. Thus, warning may be avoided if a warning is not necessary.

In connection with the above embodiment, according to which at least two different subintimal thresholds are defined, defining different time limits for the different subintimal thresholds may be provided, wherein the time limits may be adapted to the warning levels. For example, for a low warning level, the time limit may be set higher than for a high warning level.

In a further embodiment, the warning may be output as haptic, audio, visual or textual warning. The warning may be visualized on a display and/or reproduced by a loudspeaker.

If the apparatus is also configured to display the shape of the elongated device, e.g. on a monitor, it can also be provided that the visualized shape in the region of interest that caused a high curvature strength parameter may change the color, for example from green (intraluminal passage) to red (subintimal passage).

In a further embodiment, the apparatus may comprise an optical shape sensing modality comprising an optical interrogation modality configured to optically interrogate an optical fiber comprised by the elongated device and to receive optical feedback from the optical fiber.

Besides optical shape sensing, other sources of 3D shape sensing can also be used in the present invention. For example, electromagnetic tracking systems may be used.

According to a second aspect of the present invention, a system is provided, comprising an elongated flexible device and an apparatus according to the first aspect.

The flexible elongated device may be a guidewire or catheter.

According to a third aspect of the present invention, a computer-implemented method of automatically identifying subintimal passage of a flexible elongated device through a lumen is provided, comprising:
providing data processing instructions configured with curvature-related parameters to process shape- and/or position-related data of an elongated device so as to (i) determine curvature profiles along this elongated device and to ii) associate a curvature profile with a type of curvature representative of subintimal path in the lumen,
executing the instructions to shape- and/or position-related data measured along at least one segment of the elongated device and to output an information if a subintimal path has been identified.

A first embodiment of the method may comprise:
providing data representing a curvature profile along at least one shape segment of the elongated device,
determining in the curvature profile at least one section, in which the curvature profile is above a first curvature threshold level defined as representative of a deformation of the elongated device which may be due to an obstacle in the path of the elongated device,
determining from curvature values of the curvature profile in the at least one section a curvature strength parameter indicative of curvature strength in the at least one section,
identifying the path of the elongated device through the lumen as subintimal path, if the curvature strength parameter is above a subintimal threshold, and
outputting a warning if subintimal passage has been identified.

A second embodiment of the method may comprise:
providing a curvature classifier, preferably a trained curvature classifier, configured with curvature-related parameters to receive shape- and/or position-related data of the elongated device and to output a classification of curvatures along said at least one segment, wherein the classifier is configured to output at least one classification of curvature associated with a subintimal path,
applying the curvature classifier to shape- and/or position-related data measured along said at least one segment of the elongated device to output said information of a subintimal path if a subintimal path class has been found by the classifier.

In a fourth aspect of the present invention, a computer program is provided, comprising program code means for causing a computer to carry out the steps of the method according to the third aspect when said computer program is carried out on a computer.

It shall be understood that the claimed system, method and computer program have similar and/or identical preferred embodiments as the claimed apparatus, in particular as defined in the dependent claims and as disclosed herein.

A non-transitory computer-readable recording medium that stores therein the computer program is encompassed by the present disclosure.

BRIEF DESCRIPTION OF THE DRAWINGS

These and other aspects of the invention will be apparent from and elucidated with reference to the exemplary embodiments described hereinafter. In the following drawings.

DETAILED DESCRIPTION OF THE INVENTION

Figure 1:
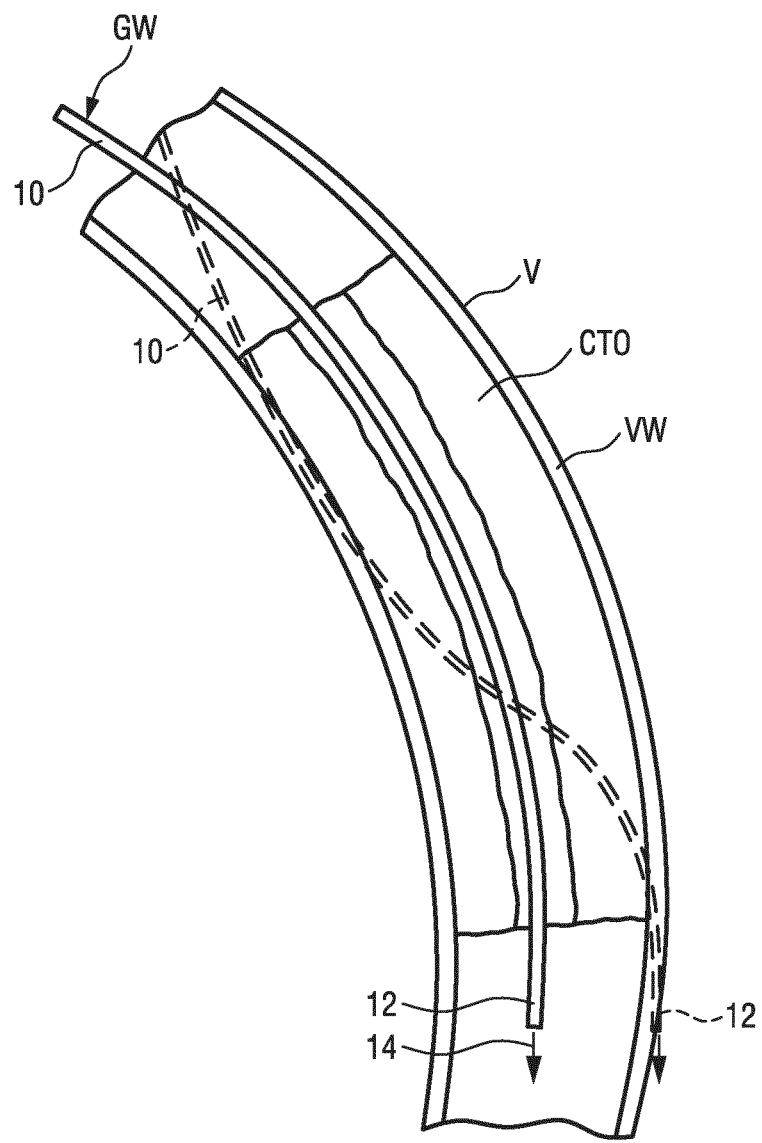
FIG. 1 shows a sketch for illustrating intraluminal and subintimal path of a flexible elongated device through a lumen of a vessel.

FIG. 1 shows a sketch for illustrating intraluminal and subintimal path of a flexible elongated device 10 through a lumen of a vessel V. The vessel V may be an artery, for example. The vessel may be subject to a chronic total occlusion CTO which narrows the lumen in the vessel V inside the vessel wall VW. A CTO can be treated by crossing the CTO with the elongated device 10, which may be a guidewire GW. After crossing the CTO with the guidewire GW, the occluded area may be ballooned. Additionally, a stent (not shown) can be placed. For treating the CTO in an endovascular intervention, the elongated device 10 is navigated through the vessel V, i.e. is advanced through the lumen of the vessel V according to an arrow 14. Reference numeral 12 denotes the tip portion of the flexible elongated device 10. When navigating the elongated device 10 through the vessel V, the elongated device 10 may undergo an intraluminal path or a subintimal path. The elongated device 10 is shown in solid lines for intraluminal path, and in broken lines for subintimal path. For a proper treatment of CTO, it is necessary that the CTO is crossed by the elongated device 10 on an intraluminal path. For example, atherectomy (debulking of the material in the occlusion) can only be performed if the crossing of the CTO was intraluminal, while crossing of the CTO on an intraluminal path is inadequate for proper treatment of the CTO. However, physicians are often not exactly aware of how a CTO is crossed by an elongated device. The present disclosure provides a computer-implemented method and an apparatus for automatically identify subintimal path of an elongated flexible device like device 10 and to provide a real-time warning about subintimal CTO track so that a physician can adapt the treatment during the surgery and make sure that atherectomy is utilized only when the crossing of the CTO by the elongated device 10 is intraluminal. Furthermore, the disclosure herein may provide a real-time warning about the degree of subintimal CTO track.

Figure 2:
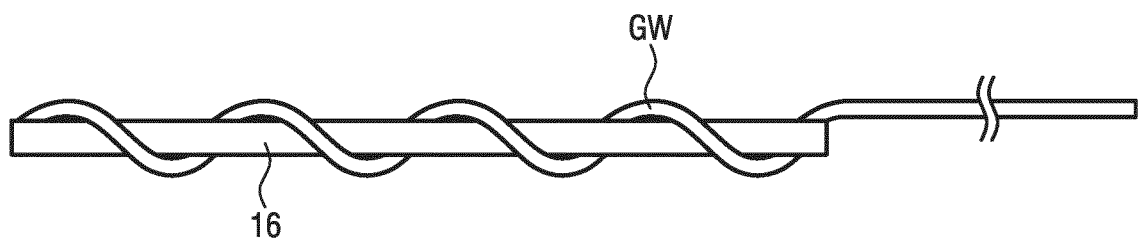
FIG. 2 shows a sketch of a flexible elongated device spiraled around a ball pen filler mimicking a flexible elongated device in a subintimal path.
Figure 3:
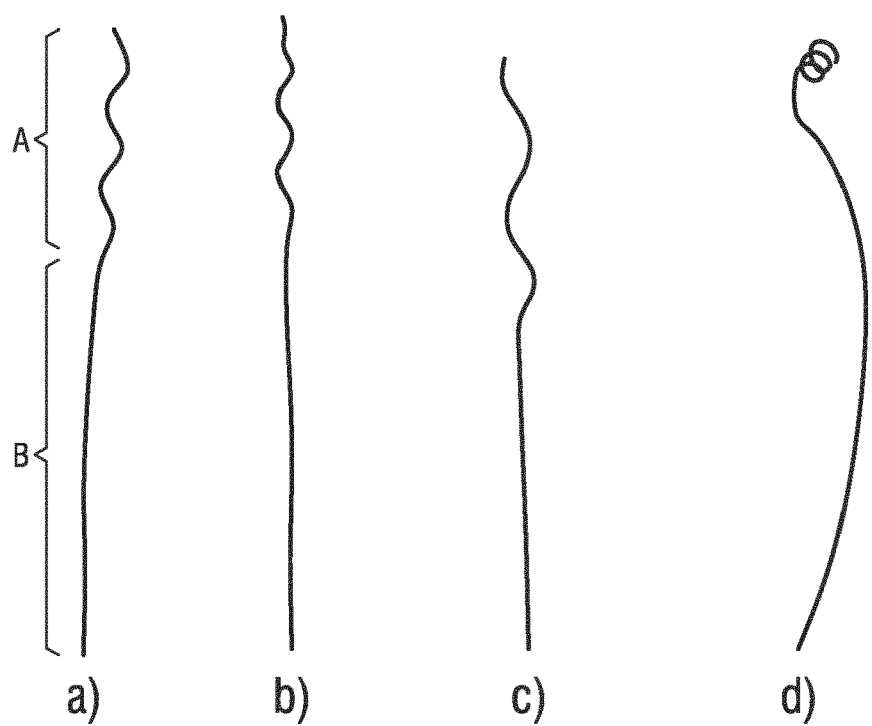
FIGS. 3a) to 3d) show visualized reconstructions of the elongated device in FIG. 2 in different views.
Figure 4:
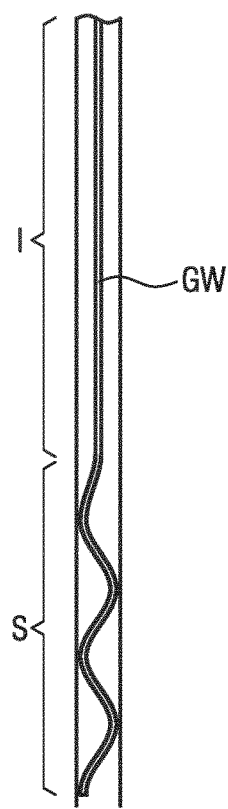
FIG. 4 shows a visualized reconstruction of an elongated device inserted into a lumen of a vessel in a real case.

With reference to FIGS. 2 to 4, it will be described how the 3D shape of an elongated device like guidewire GW appears when undergoing subintimal path.

A bench test was conducted with an optical shape sensing enabled guidewire GW shown in FIG. 2. According to FIG. 2, the guidewire GW was spiraled around a 3 mm diameter ball pen filler 16 mimicking a 3 mm lumen of a vessel. The present teachings are based on the idea that a guidewire, when in the subintimal path, takes a spiraled shape along the subintimal path. Thus, the spiraling of the guidewire GW around the ball pen filler has been made to mimic the assumed spiraling of a guidewire in the subintimal space.

The guidewire GW spiraled around the ball pen filler 16 was shape-sensed, in the present case optically shape-sensed. Optical shape sensing has been performed with an optical frequency domain reflectometry (OFDR) sensing system. FIGS. 3a) to 3d) show reconstructions of the guidewire in different views created by an optical shape sensing viewing software. FIG. 3a) shows a front view, FIG. 3b) shows a side view, FIG. 3c) shows an enlarged front view and FIG. 3d) shows a view in longitudinal direction of the ball pen filler 16.

As can be seen in FIGS. 3a) to d), the 3D-reconstruction of the guidewire has a spiraled configuration in a region A where it is spiraled around the ball pen filler 16 which is distinct from the normal straight configuration in region B.

FIG. 4 shows the visualization of the reconstructed shape of an optical shape sensing enabled guidewire in a real case where the guidewire has undergone subintimal passage through a CTO. As can be taken from FIG. 4, also in the real case the guidewire GW has a spiraled configuration in the subintimal region S, and a normal/straight configuration in the intraluminal region I. This distinction forms the basis of the present teachings to automatically detect if the guidewire GW is in the intraluminal or subintimal space, or partially in the subintimal and partially in the intraluminal path. According to the present disclosure, transitions from the intraluminal into the subintimal space and vice versa may also be detected.

Based on the idea that the shape of a flexible elongated device like a guidewire has a spiraled or helical configuration in the subintimal region, it will be described further how the spiraled configuration of the elongated device 10 can be detected with low amount of computation.

As explained above, the 3D shape of the elongated device 10 in the subintimal path may be in the form of an (imperfect) helix. A perfect cylindrical helix can be described mathematically by the following parametrization:

$$x(t) = a \cos(t)$$
$$y(t) = a \sin(t),$$
$$z(t) = bt,$$

wherein a is the radius and b/a is the slope of the helix. Because of the similarity of the 3D shape of the elongated device 10 in the subintimal path to a helix, the distal part of every shape may be fit to the above parametrization and evaluated how much it fits to a helix. This computational operation however may require a large amount of computation when doing this computation for every shape measurement during navigation of the elongated device 10, and the computation may not always provide a unique solution. Furthermore, the shape of the elongated device is not always going to fit to a helix because of shape measurement inaccuracy and the formation of the actual subintimal path. Therefore, the present teachings propose an indirect, but more practical solution that can handle both imperfectness of the shape sensing data and the subintimal passage without a large amount of computation.

The method according to the present disclosure analyzes the curvature profile obtained from a measurement of the shape of the elongated device 10. The reason why curvature is a good candidate for the identification of subintimal path is that the curvature of a perfect cylindrical helix is a constant and with reference to the parameters a and b above, is equal to $$|a|/(a^2 + b^2).$$

As the shape of the elongated device 10 in the subintimal path is expected to be similar to a helix shape, it is consequently to be expected that the 3D shape of the elongated device 10 has a significantly higher curvature in a subintimal path in comparison to an intraluminal path. If the subintimal path results in an ideal helix shape of the elongated device, then a rectangular curvature profile with high constant curvature should be observed. When the tip portion 14 of the device 10 is in the subintimal path, the elevated constant curvature profile occurs at the most distal part of the curvature profile.

In practice, because of shape sensing inaccuracy, data imprecision, and a difference of the actual navigation from a perfect helix, the actual shape of the elongated device in the subintimal path will deviate from the ideal helix and thus the curvature profile from the perfectly rectangular profile. However, the curvature profile will still have elevated curvature throughout the subintimal path.

Figure 5:
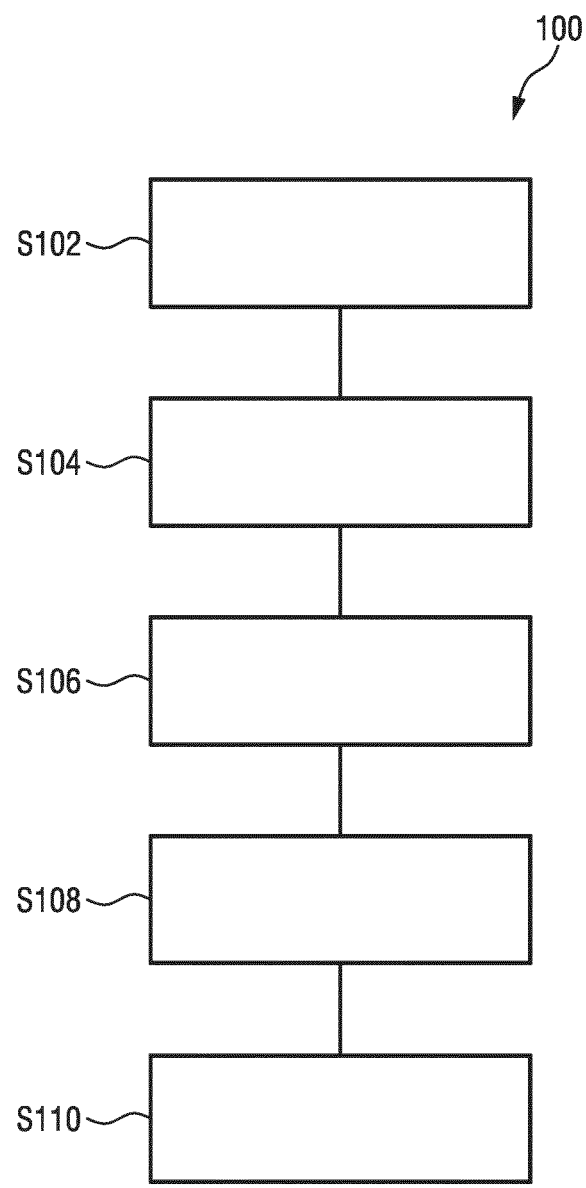
FIG. 5 shows a flow diagram of a method of identifying subintimal path of a flexible elongated device.

FIG. 5 shows a flow diagram of an embodiment of a computer-implemented method of automatically identifying subintimal path of an elongated device. The method 100 comprises a step S102 of measuring a curvature profile along at least one shape segment of the elongated device 10. Measuring the curvature profile may be performed by evaluating shape sensing data obtained from a shape sensing modality, like an optical shape sensing modality or any other source of shape sensing data. Curvatures may be extracted or calculated from the shape sensing data as known to those skilled in the art.

Figure 6:
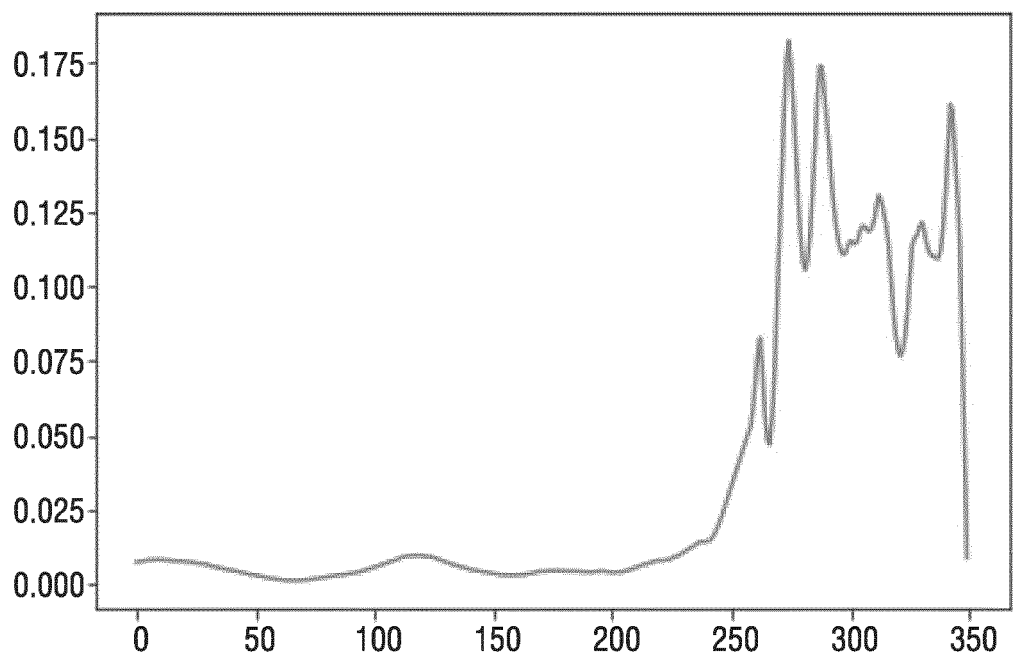
FIG. 6 shows a diagram of a measured curvature profile of an elongated device subject to subintimal path.
Figure 7:
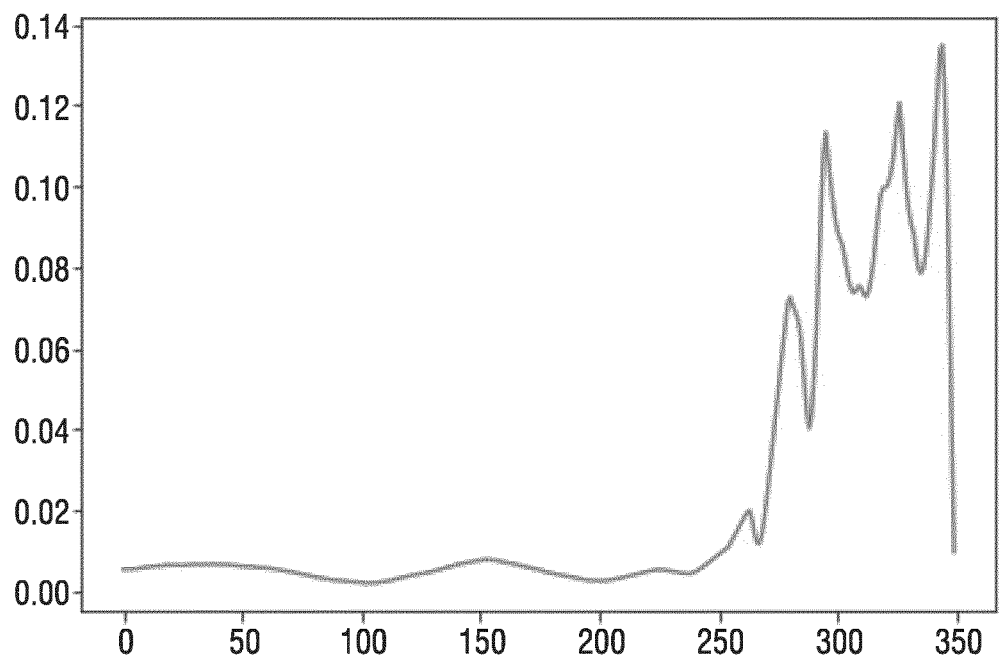
FIG. 7 shows a diagram of a curvature profile at another position of the device along the subintimal path.
Figure 8:
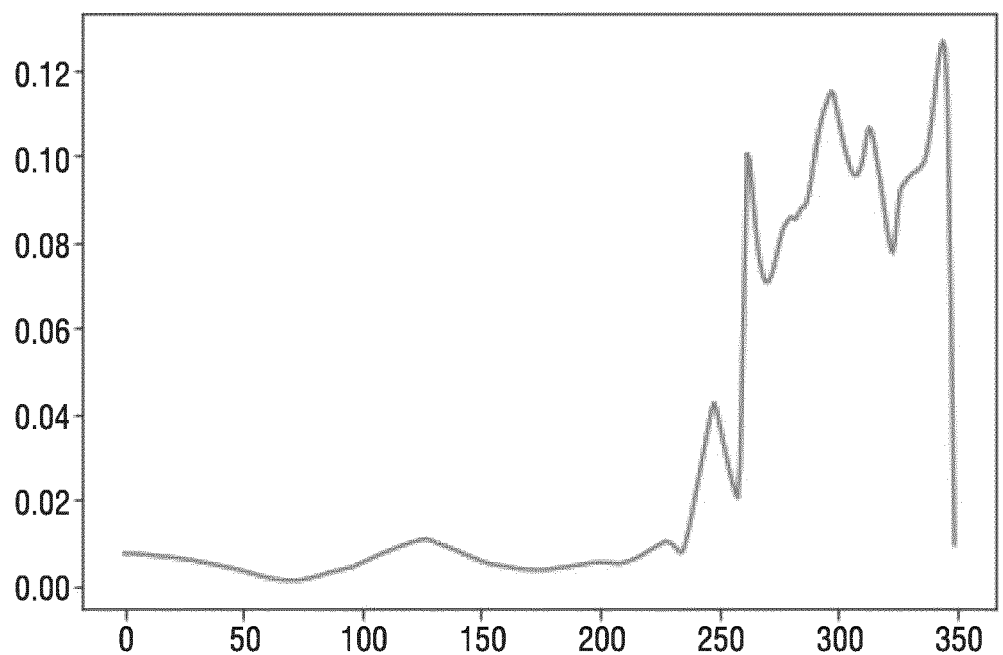
FIG. 8 shows a diagram of a curvature profile at still another position of the device along the subintimal path.

FIG. 6 shows a diagram of a curvature profile at a distal portion of an elongated device 10, wherein the distal portion is in the subintimal path. The x-axis in FIG. 6 shows the sample points (nodes) of the shape sensing data, and the y-axis shows the curvature (in units of reciprocal sample points). A sample point 350 is the tip of the elongated device 10. The shape sensing data in FIG. 6 were obtained in a real case of an elongated device navigated through a vessel. As can be seen in FIG. 6, the curvature profile has curvature values from sample points 270-350 which are significantly elevated in comparison to the curvature values of the curvature profile below sample point 270. Similar curvature profiles occur at various positions of the device along the subintimal path as shown in FIG. 7 and FIG. 8. Thus, as long as the device 10 is in the subintimal path, the curvature profile of each shape measurement will show elevated curvatures in the subintimal path during navigation of the device 10. As can be taken from FIGS. 6 to 8, the curvature values in the region where the curvature values are elevated differ from FIG. 6 to FIG. 7 and from FIG. 7 to FIG. 8. Nevertheless, the curvature profile shows a distinct region of high curvature. That is, the distal portion including the tip (sample point 350) of the device 10 is assumed to be in the subintimal path.

Figure 9:
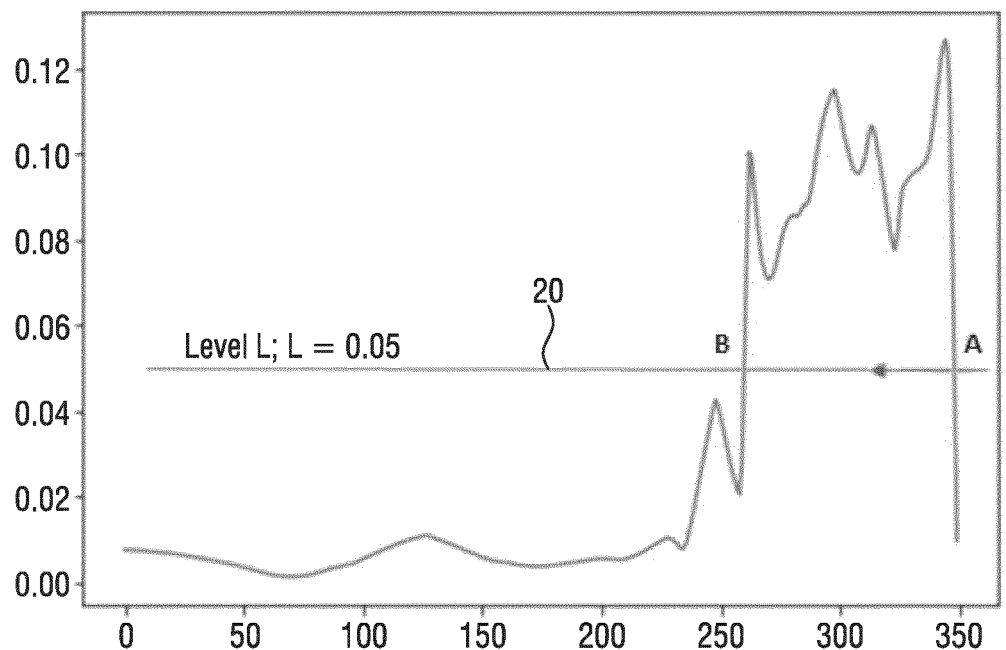
FIG. 9 shows a diagram of the curvature profile in FIG. 8 which illustrates analysis of the curvature profile in FIG. 8.

With reference to FIG. 5 again, the method 100 proceeds with a step S104 of determining in the curvature profile at least one section, in which the curvature profile is above a first curvature threshold level. The curvature threshold level is defined as representative of a deformation of the elongated device which may be due to an obstacle in the path of the elongated device. FIG. 9 shows an embodiment of an implementation of method step S104. The first curvature threshold level 20 is preferably set as a low curvature value, e.g. 0.5 as shown in FIG. 9. Determination of the at least one section in which the curvature profile is above the first curvature threshold level may be performed by determining crossing points A and B of the curvature profile with the first curvature threshold level 20. This in turn may be performed by scanning the curvature profile from distal (sample point 350) to proximal (sample point 0) (or vice versa) and finding the locations A and B where the curvature profile passes the level 20.

Figure 10:
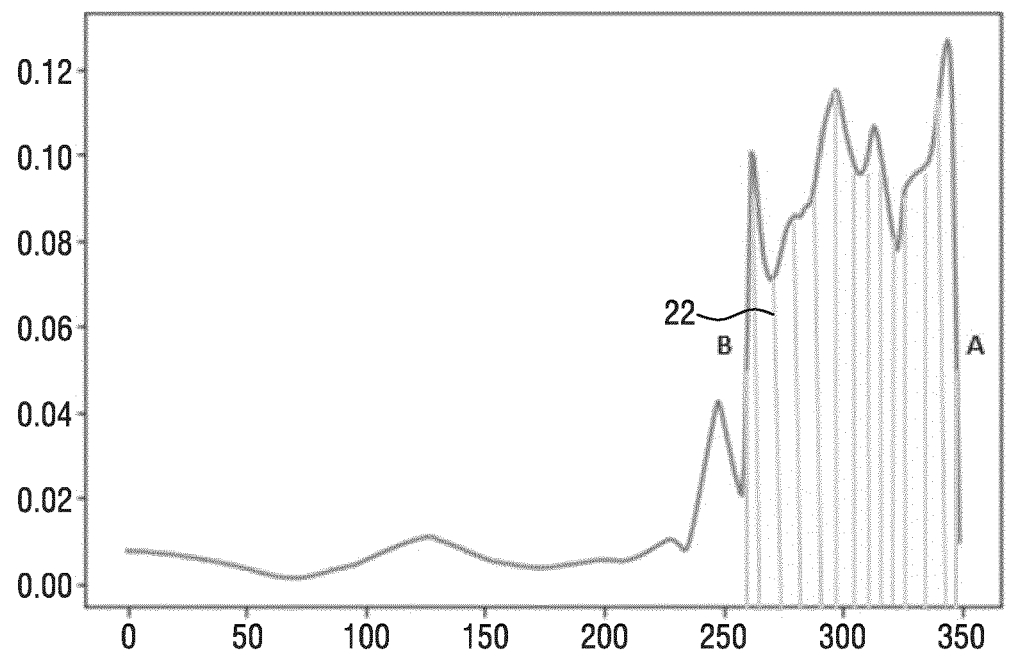
FIG. 10 shows a diagram of the curvature profile in FIG. 8 which illustrates further analysis of the curvature profile in FIG. 8.

With reference to FIG. 5 again, the method 100 proceeds to a step S106 of determining from curvature values of the curvature profile in the at least one section in which the curvature profile is above the first curvature threshold level 20 a curvature strength parameter which is indicative of how strong curvature is in the at least one section A-B. In an embodiment shown in FIG. 10, the curvature strength parameter is determined as the sum of the curvature values in the section A-B of the curvature profile. The operation of summing the curvature values in the section A-B is illustrated by vertical lines 22 in FIG. 10. In another embodiment, the curvature strength parameter may be determined as the mean of the curvature values in the section A-B of the curvature profile.

With reference to FIG. 5 again, the method 100 comprises a step S108 of identifying the path of the elongated device 10 through the lumen as subintimal path, if the curvature strength parameter determined beforehand is above a subintimal threshold. In case of determining the curvature strength parameter as the sum of the curvature values in the section A-B, the subintimal threshold may be a value which can be set much larger, e.g. by an order of magnitude, than the first curvature threshold level 20.

The method 100 further proceeds to step S110 of outputting a warning if subintimal passage has been identified. The warning may be output as haptic, audio, visual or textual warning.

Figure 11:
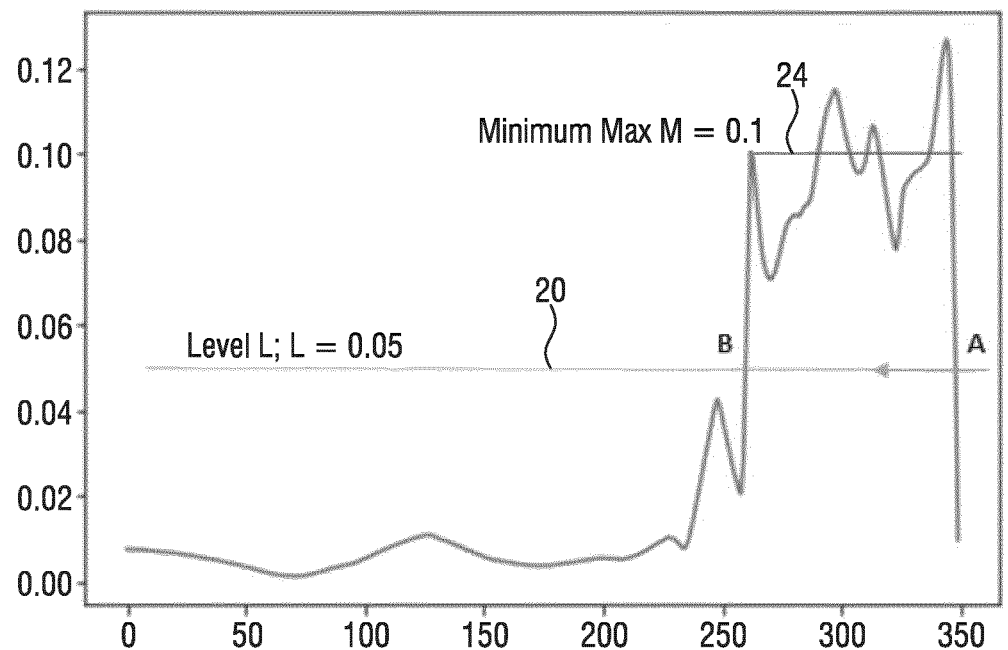
FIG. 11 shows another diagram of the curvature profile in FIG. 8 which illustrating further analysis of the curvature profile in FIG. 8.

The method 100 may further comprise, for example before step S106, and after step S104, a step of identifying the section A-B as not indicating subintimal passage, if the maximum curvature value in the section A-B is below a second curvature threshold level higher than the first curvature threshold level 20. This is shown in FIG. 11, where a second curvature threshold level 24 is indicated. For example, the second curvature threshold level 24 may be in a range from 1.5-2.5, e.g. 2, times the first curvature threshold level 20. In the example of FIG. 11, the second curvature threshold level 24 is set to 0.1, so twice the first curvature threshold level. This step may advantageously avoid noisy calculations or may advantageously be used to discard the curvature profiles exceeding the first threshold for a long time but not achieving a maximum value as high as the second threshold.

While in the above description only the distal shape segment including the tip of the elongated device 10 has been considered, other shape segments of the elongated device 10 between the distal and the proximal end may be considered. However, performing the method for the distal shape segment of the elongated device 10 is of most importance and advantage.

The method 100 may further comprise, after step S104, determining the distance of the distal end A of the section A-B from the distal tip 14 of the elongated device 10, and to identify the section A-B as the distal tip portion, if the determined distance is lower than a threshold distance. Otherwise, the segment under consideration is not considered a distal shape segment, and the distal shape segment curvature strength parameter may be set to zero, if the method of identifying subintimal path is only applied or interesting for the distal tip portion of the device 10.

Figure 12:
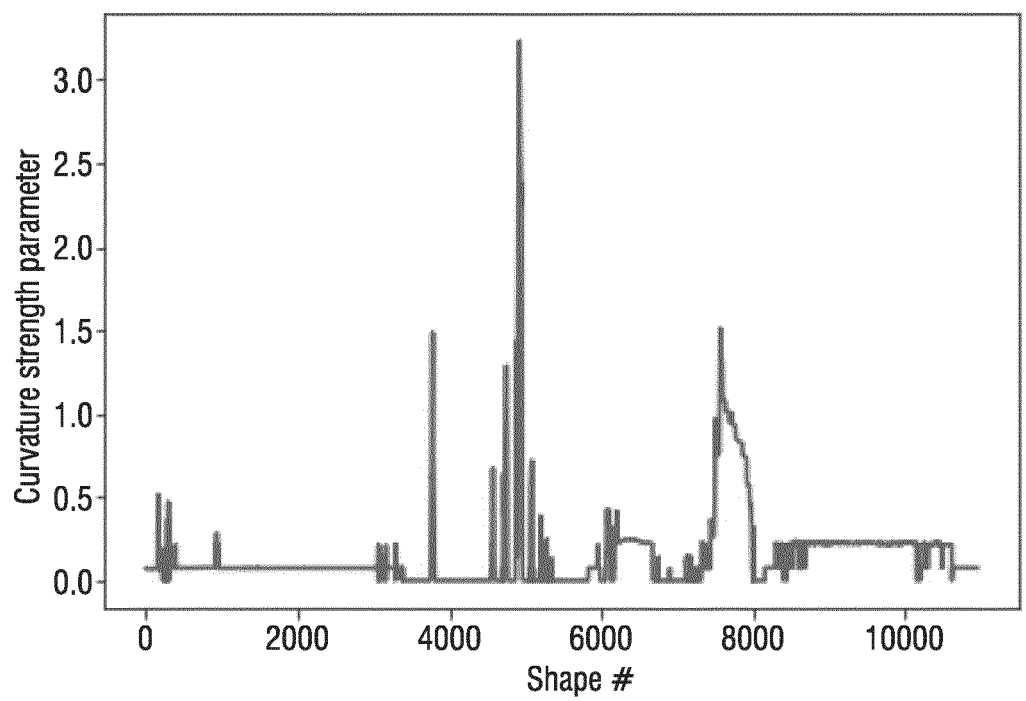
FIG. 12 shows a diagram illustrating curvature strength parameters in a distal shape segment of an elongated device for a number of shape measurements, wherein subintimal path did not occur during navigation of the device.
Figure 13:
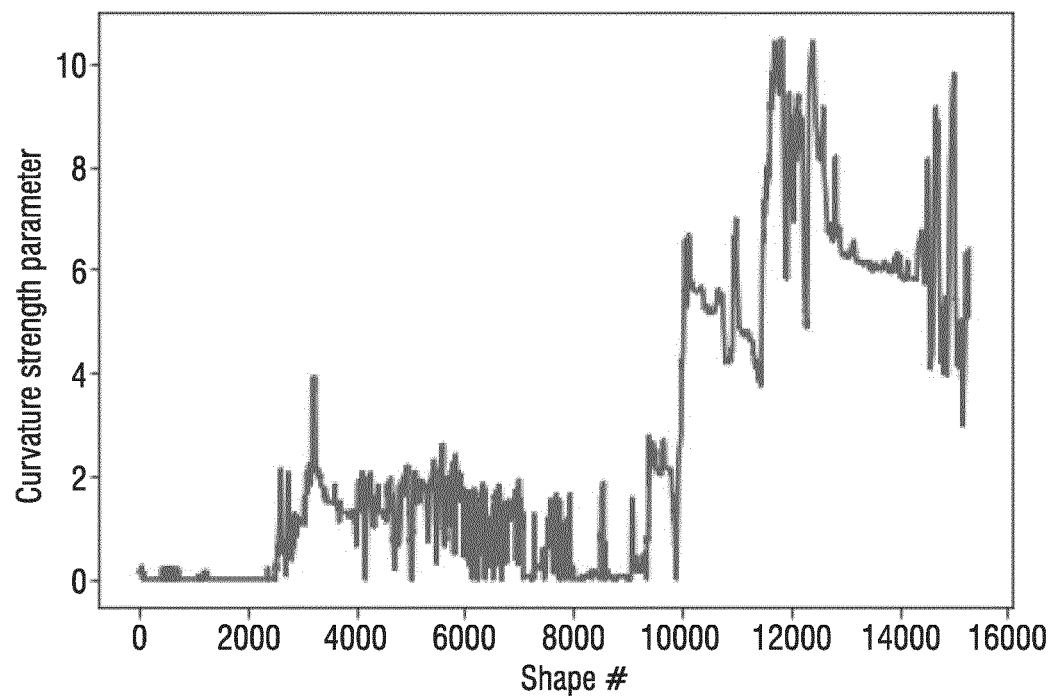
FIG. 13 a diagram similar to FIG. 12, wherein subintimal path has occurred during navigation of the device.

Summarizing the foregoing, for every shape of the device during navigation, a curvature strength parameter can be determined, or multiple curvature strength parameters may be determined in case that for example non-distal shape segments shall be evaluated as well, and decisions based on these curvature strength parameter(s) can be made. FIG. 12 and FIG. 13 show the distribution of these curvature strength parameters for a large number of shape runs. FIG. 12 shows the determined curvature strength parameters for a number of more than 10,000 shape measurements (shape runs) recorded without subintimal path and with subintimal path in FIG. 13, respectively. The curvature strength parameters have been computed without requiring that the maximum curvature values in section A-B are above the second curvature threshold level 24 (FIG. 11). When requiring maximum curvature values in section A-B above the second curvature threshold value, some of the lower values in FIGS. 12 and 13 are impacted, while the higher ones, which are more important to give a warning or not, are not impacted.

In FIG. 12, all curvature strength parameters determined for each shape run are below 4 which has been set as the subintimal threshold, and most of the values are below 2, indicating a normal navigation of the elongated device.

In FIG. 13, the curvature strength parameter for each shape run show subintimal passage after shape run #10,000 and a short attempt around shape run #3,500. The values beginning from shape run 10,000 are mostly above 6 indicating subintimal path of the elongated device 10, whereas the curvature strength parameter is below 4 in the region of navigation, indicating intraluminal path.

It may also be envisaged in the method according to the present teachings to set more than one subintimal threshold, for example 2, 3, 4, 5 or more, and to output different warning levels according to the different subintimal thresholds. For example, multiple warning levels may be predetermined, such as 4, 6, 8, 10, and when the curvature strength parameter is above one of these levels, a color-coded warning may be provided, such as yellow, orange, light red, and dark red. Thus, the severity of the deviation of the path of the elongated device 10 from the intraluminal path can be indicated to the physician.

It is also possible within the scope of the method according to the present teachings to include a timing constraint to the warning levels. That is, one or more time limits may be set, wherein in the case of multiple different time limits, each time limit may be assigned to one of the different subintimal thresholds. For example, the time limit of 2 seconds for curvature strength parameters below 6 and 1 second for values above 6. The warning is provided only when both amplitude and timing constraints are satisfied.

Further, the color of the visualized shape in the region-of-interest that caused high curvature strength parameter may be changed, for example from green to red.

In the following, another embodiment of the method of identifying subintimal path will be described.

The curvature related parameters described above can be estimated with supervised machine learning and optimization techniques. The same method as described above may be used. However, the curvature-related parameters indicated above are determined optimally by using an annotated set of shapes. The annotated shape set may include the following for each shape in the set:
  shape information (e.g. position, strain, curvature, twist, alpha values);
  start and end segment(s) of the shape with elevated curvature;
  a first label for the whole shape indicating if the tip of the shape is in the CTO region;
  a second label for the whole shape indicating the degree that the shape is following subintimal path, where the degree can be a continuous measure, or a level from a multi-level scale (e.g. binary is a special case where 0 indicates intraluminal path, 1 indicates subintimal path).

By using the annotated set, the values of the curvature-related parameters, such as the first and the second curvature threshold values, can be determined to maximize the detection of shape segments with elevated curvature. Because only two parameters are to be estimated, a full search of the combinations can be made and the accuracy can be evaluated by using the first label of the annotated dataset above, and the combination of values resulting in the best accuracy can be picked.

To determine the value of the subintimal threshold for curvature strength, a similar method can be used, and in this case the accuracy can be determined by using the second label and maximizing that. This optimal threshold can be calculated separately for both using the sum or the mean of the curvature in the determined shape segment. In case another method to measure the curvature strength is conceived, the optimal threshold can be re-calculated by using that method.

Another embodiment of a method of identifying subintimal path will be described below, which uses an AI-based shape classification.

In this embodiment, subintimal passage likelihood is used to indicate the degree that a device passes through the CTO subintimally. In the previous embodiments, this was determined as 0/1 by comparing the curvature strength to a threshold value. In the AI-based method, this can be calculated as a continuous value between 0 and 1 without the explicit use of curvature strength. Thus, subintimal passage likelihood is a more general term to describe this situation.

AI-based shape classification can be used as follows.

A whole shape, or a part of it, can be classified as subintimal or intraluminal and, in addition to that, a degree can be assigned to it. The degree may be indicative of subintimal passage likelihood. In the case of [0,1], the lower values are indicative of the shape, or part of the shape, more likely to be passing through intraluminal path whereas the higher values are indicative of subintimal path.

The training of a deep neural network to classify a shape into subintimal or intraluminal path can be accomplished by using the same annotated set as above. In this case, a deep neural network can be trained by using the shape as input and the label (subintimal or intraluminal) as the ground truth class. Shape features, such as position, curvature, strain, twist, alpha values can be provided as input. It is also possible that multiple shapes can be provided as input. The network architecture can be a classification network. The typical architectures in the literature, such as ResNet architecture (K He, X Zhang, S Ren, J Sun, "Deep residual learning for image recognition," Computer Vision and Pattern Recognition Conf., 2015) can be used for this purpose.

In another embodiment, a deep neural network can be trained to classify a shape along its length to different classes. In this task, the same dataset as above may be used, but the information about the start and end segment(s) of the shape with elevated curvature is used to generate a ground truth. For every shape, a ground truth shape is generated that consists of 0 and 1. The value of zero is assigned to shape positions outside the CTO and the value of one to positions in the CTO. When a shape of a length of N samples (points) is given as input, the ground truth for that shape is also N-sample long, with 0/1 values for outside CTO and inside CTO, respectively. This type of problem is also known as segmentation problem. As above, state-of-the-art neural networks can be used for shape segmentation. A common segmentation network is U-Net (O. Ronneberger, P. Fischer, T. Brox, U-Net: Convolutional Networks for Biomedical Image Segmentation, Medical Image Computing and Computer-Assisted Intervention (MICCAI), Springer, LNCS, Vol. 9351: 234-241, 2015). Again as in the classification case, shape with features, such as position, curvature, twist, strain, etc. can be used as input and the segmented shape can be estimated as output. This output segmentation map can be compared with ground truth shape segmentation during training of the deep neural network. When sufficient accuracy is obtained or when the progress between iterations is low, the training stops and the best network during those iterations is used for segmentation of shape. With this method, parts of the shape that goes through CTO or healthy segments can be identified.

Figure 14:
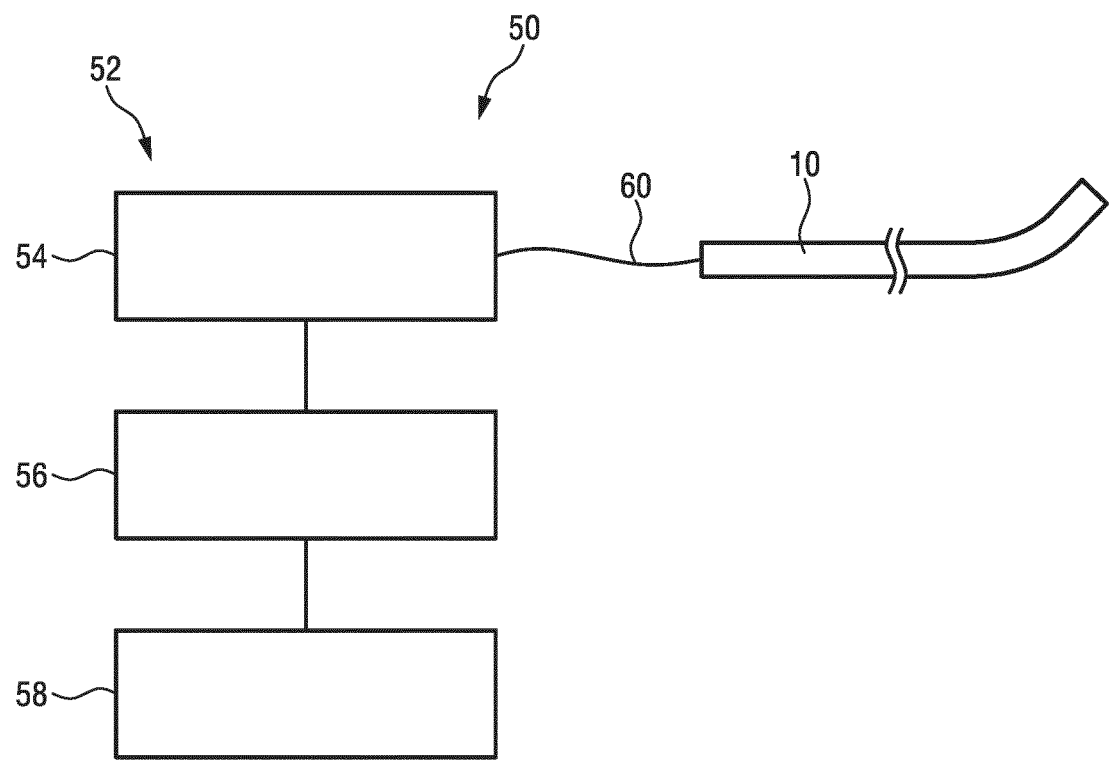
FIG. 14 is a block diagram of a system for identifying subintimal path of a flexible elongated device.

FIG. 14 shows a system 50 for identifying subintimal path of an elongated device 10 which is configured to carry out the method according to the present teachings.

The system 50 comprises an apparatus 52 comprising a shape sensing modality 54, a memory 56 and a processor 58. The apparatus may further comprise a display and/or a loudspeaker (not shown).

The shape sensing modality 54 is configured to measure the curvature profile according to step S102. The memory 56 stores data processing instructions configured with curvature-related parameters to process shape- and/or position-related data of an elongated device like device 10. The shape- and/or position-related data may be used to determine curvature profiles along this elongated device and to associate a curvature profile with a type of curvature representative of subintimal path in the lumen. The processor 57 is in communication with the memory 56 and configured to execute the instructions to shape- and/or position-related data measured along at least one segment of the elongated device (10) and to output an information if a subintimal path has been identified.

The processor 58 may be configured to perform the steps S104 to S110.

The shape sensing modality 54 may be an optical shape sensing modality comprising an optical interrogation modality configured to optically interrogate an optical fiber 60 comprised by the elongated device 10 and to receive optical feedback from the optical fiber 60. The system 50 further comprises the elongated flexible device 10, which may be configured as a guidewire, for example.

The data processor 58 may be implemented as hardware, firmware or software.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other modality may fulfill the functions of several items recited in the claims. The mere fact that certain measures are recited in mutually different dependent claims does not indicate that a combination of these measures cannot be used to advantage.

A computer program comprising code means to carry out the method according to the invention may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. An apparatus for identifying a subintimal path of a flexible elongated device through a lumen, the apparatus comprising:
   a memory storing instructions configured with curvature-related parameters to process at least one of shape-related data of the elongated device or position-related data of the elongated device to (i) determine a curvature profiles along this elongated device and to ii) associate the curvature profile with a type of curvature representative of subintimal path in the lumen,
   a processor in communication with the memory, the processor configured to:
      execute the instructions with at least one of shape-related data or position-related data measured along at least one segment of the elongated device,
      output information if a subintimal path of the elongated device through the lumen has been identified.

2. The apparatus of claim 1, wherein the instructions cause the processor to:
   measure a curvature profile along at least one shape segment of the elongated device, and
   determine in the curvature profile at least one section, in which the curvature profile is above a first curvature threshold level defined as representative of a deformation of the elongated device caused by an obstacle in a path of the elongated device,
   determine from curvature values of the curvature profile in the at least one section a curvature strength parameter indicative of curvature strength in the at least one section,
   identify the path of the elongated device through the lumen as the subintimal path, if the curvature strength parameter is above a subintimal threshold level, and
   output the information as a warning when the subintimal path has been identified.

3. The apparatus of claim 1, wherein the instructions comprise:
   curvature-related parameters to receive at least one of shape-related data of the elongated device or position-related data of the elongated device and to output a classification of curvatures along the at least one segment, wherein the instructions are configured to output at least one classification of curvature associated with the subintimal path, wherein the processor in communication with the memory is configured to apply the instructions to the at least one of the shape-related data or the position-related data measured along the at least one segment of the elongated device to output the information of the subintimal path if a subintimal path class has been found by execution of the instructions.

4. The apparatus of claim 2, wherein the instructions comprise instructions to determine the curvature strength parameter as a sum of the curvature values in the at least one section of the curvature profile, or determine the curvature strength parameter as a mean of the curvature values in the at least one section of the curvature profile.

5. The apparatus of claim 2, wherein the instructions comprise instructions to identify the at least one section as not indicating subintimal passage, if a maximum curvature value is below a second curvature threshold level higher than the first curvature threshold level.

6. The apparatus of claim 2, wherein the instructions comprise instructions to determine the at least one section by determining crossing points of the curvature profile with the first curvature threshold level.

7. The apparatus of claim 1, wherein the at least one shape segment of the elongated device includes the distal tip of the device.

8. The apparatus of claim 7, wherein the instructions comprise instructions to determine a distance of a distal end of the at least one section from a distal tip portion of the elongated device, and identify the at least one section as the distal tip portion, if the determined distance is lower than a threshold distance.

9. The apparatus of claim 2, wherein the instructions comprise instructions to set at least two different subintimal thresholds, and output different warnings according to the different subintimal thresholds.

10. The apparatus of claim 1, wherein the instructions comprise instructions to set a time limit and output the information if the curvature profile representative of subintimal path is detected for a time period exceeding the time limit.

11. The apparatus of claim 9, wherein the instructions comprise instructions to set different time limits, each time limit assigned to one of the different subintimal thresholds.

12. The apparatus of claim 1, wherein the instructions comprise instructions to output the information as haptic, audio, visual, or textual information.

13. A system, comprising an elongated flexible device and an apparatus according to claim 1.

14. A computer-implemented method of automatically identify a subintimal path of a flexible elongated device through a lumen, the method comprising:
  providing data processing instructions configured with curvature-related parameters to process at least one of shape-related data or position-related data of an elongated device to (i) determine a curvature profiles along the elongated device and to ii) associate the curvature profile with a type of curvature representative of a subintimal path in the lumen,
  executing the instructions with at least one of shape-related data or position-related data measured along at least one segment of the elongated device and to output information if a subintimal path has been identified.

15. A non-transitory computer-readable storage medium having stored a computer program comprising instructions which, when executed by a processor, cause the processor to:
  receive at least one of shape-related data or position-related data measured along at least one segment of an elongated device,
  determine a curvature profile along the elongated device based on the measured at least one of the shape-related data or the position-related data,
  associate the curvature profile with a type of curvature representative of a subintimal path in the lumen, and
  output information if a subintimal path of the elongated device through the lumen has been identified.

* * * * *